US008147629B2

(12) United States Patent
Baig

(10) Patent No.: US 8,147,629 B2
(45) Date of Patent: Apr. 3, 2012

(54) CEILING TILE CONSTRUCTION

(75) Inventor: Mirza A. Baig, Lindenhurst, IL (US)

(73) Assignee: USG Interiors, LLC, Chicago, IL (US)

(*) Notice: Subject to any disclaimer, the term of this patent is extended or adjusted under 35 U.S.C. 154(b) by 233 days.

(21) Appl. No.: 12/121,831

(22) Filed: May 16, 2008

(65) Prior Publication Data

US 2008/0216936 A1 Sep. 11, 2008

Related U.S. Application Data

(62) Division of application No. 11/352,729, filed on Feb. 13, 2006, now Pat. No. 7,703,243.

(51) Int. Cl.

| | |
|---|---|
| ***B29C 65/00*** | (2006.01) |
| ***B32B 29/00*** | (2006.01) |
| ***B32B 37/00*** | (2006.01) |
| ***B32B 3/24*** | (2006.01) |
| ***E04B 2/00*** | (2006.01) |
| ***E04F 13/00*** | (2006.01) |
| ***B28B 1/48*** | (2006.01) |
| ***B29D 19/08*** | (2006.01) |

(52) U.S. Cl. ............... 156/45; 156/46; 156/71; 264/154

(58) Field of Classification Search .................... 156/45, 156/71; 264/154

See application file for complete search history.

(56) References Cited

U.S. PATENT DOCUMENTS

| | | | |
|---|---|---|---|
| 1,597,623 A | 8/1926 | Schumacher | |
| 2,326,763 A | 8/1943 | Crandell | |
| 2,668,123 A | 2/1954 | Copeland | |
| 2,924,856 A | 2/1960 | Price | |
| 3,908,062 A | 9/1975 | Roberts | |
| 4,414,262 A | 11/1983 | Hartmann et al. | |
| 4,853,085 A | 8/1989 | Johnstone et al. | |
| 4,911,788 A | 3/1990 | Pittman et al. | |
| 5,277,762 A | 1/1994 | Felegi et al. | |
| 5,320,677 A * | 6/1994 | Baig | 106/780 |
| 5,395,438 A | 3/1995 | Baig et al. | |
| 5,397,631 A | 3/1995 | Green et al. | |
| 5,552,187 A | 9/1996 | Green et al. | |
| 5,558,710 A | 9/1996 | Baig | |
| 5,637,362 A | 6/1997 | Chase et al. | |
| 5,700,527 A | 12/1997 | Fuchs et al. | |
| 5,911,818 A | 6/1999 | Baig | |
| 5,922,447 A | 7/1999 | Baig | |
| 5,964,934 A | 10/1999 | Englert | |
| 6,268,042 B1 | 7/2001 | Baig | |
| 6,387,172 B1 | 5/2002 | Yu et al. | |
| 6,409,824 B1 | 6/2002 | Veeramasuneni et al. | |
| 6,443,256 B1 | 9/2002 | Baig | |
| 6,443,257 B1 | 9/2002 | Wiker et al. | |
| 6,481,171 B2 | 11/2002 | Yu et al. | |
| 6,675,551 B1 | 1/2004 | Fuchs | |

(Continued)

*Primary Examiner* — Philip Tucker
*Assistant Examiner* — Michael Orlando
(74) *Attorney, Agent, or Firm* — Pearne & Gordon LLP

(57) ABSTRACT

A ceiling tile of gypsum and cellulose fibers formed into a board by initially mixing the fibers and gypsum in a water-based slurry that is felted and thereafter pressed and dried with a desired board thickness, the dried board being processed to form a plurality of holes in a face thereof through at least the majority of the thickness of the board, the collective volume of the holes being sufficient to reduce the weight of the board by at least 10% and increase the NRC exhibited by the board over that which would otherwise be found in a board of the same composition without such holes.

2 Claims, 1 Drawing Sheet

U.S. PATENT DOCUMENTS

| | | | | |
|---|---|---|---|---|
| 2002/0112651 | A1* | 8/2002 | Yu et al. | 106/772 |
| 2003/0041987 | A1* | 3/2003 | Foster et al. | 162/145 |
| 2003/0211305 | A1 | 11/2003 | Koval et al. | |
| 2003/0232182 | A1 | 12/2003 | Bruce et al. | |
| 2005/0031842 | A1 | 2/2005 | Felegi et al. | |
| 2006/0068186 | A1 | 3/2006 | Leclercq et al. | |
| 2007/0051062 | A1 | 3/2007 | Baig et al. | |
| 2007/0125011 | A1 | 6/2007 | Weir et al. | |
| 2007/0220824 | A1 | 9/2007 | Hasegawa et al. | |
| 2007/0298235 | A1 | 12/2007 | Yoshida et al. | |

* cited by examiner

FIG. 1
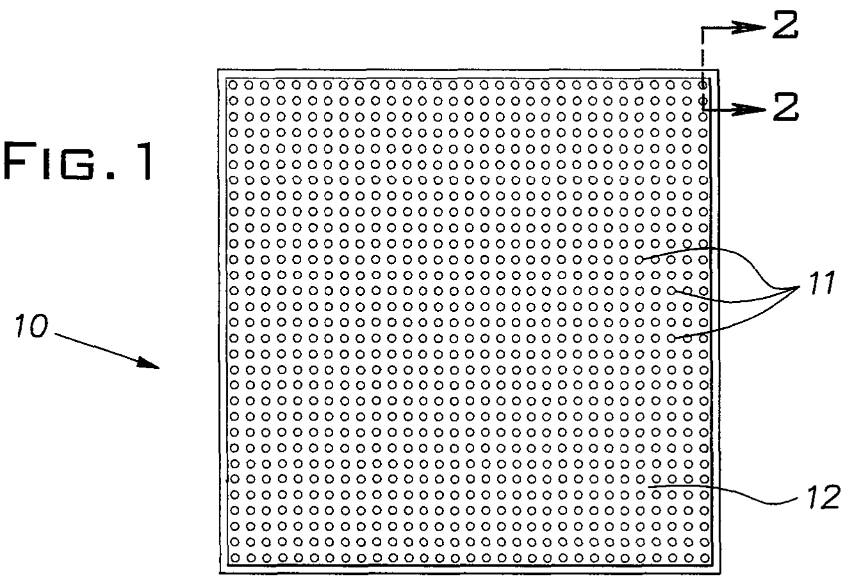
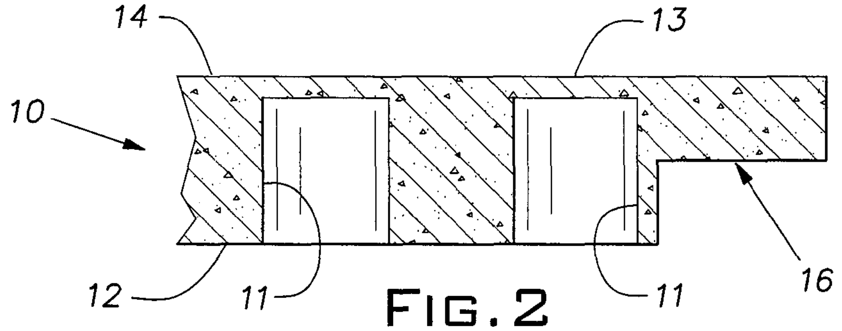
FIG. 2
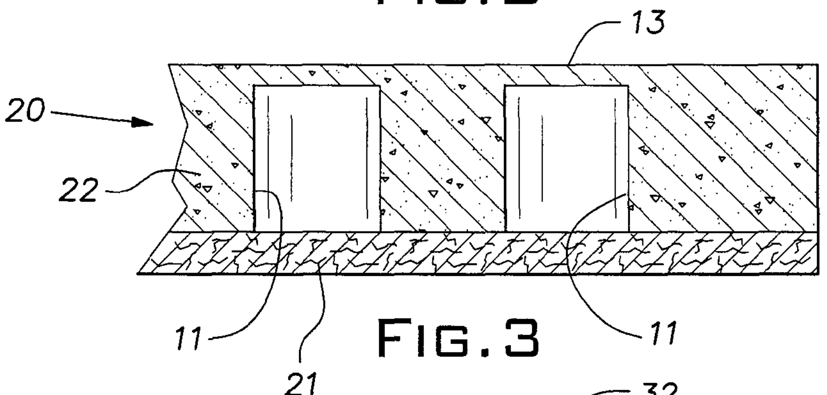
FIG. 3
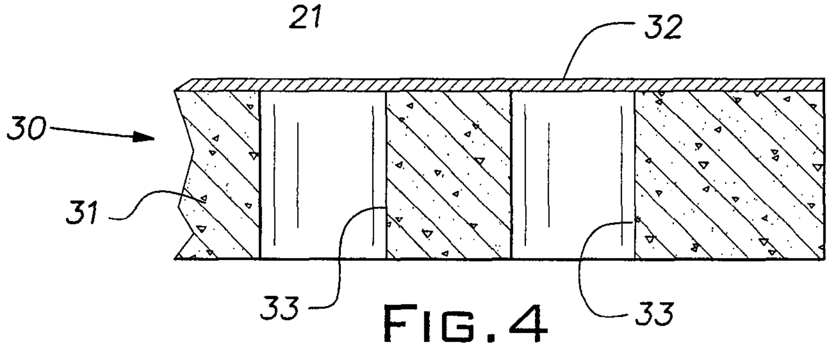
FIG. 4

CEILING TILE CONSTRUCTION

RELATED APPLICATIONS

The present application is a divisional of application Ser. No. 11/352,729, filed Feb. 13, 2006, now U.S. Pat. No. 7,703, 243.

BACKGROUND OF THE INVENTION

The invention relates to improvements in suspended ceiling tile and, in particular, to a novel combination of a composite material and mechanical modifications for a structural body for such tile.

PRIOR ART

Conventional suspended ceiling tile is typically relatively light in weight or, more accurately, low in density. This low weight is advantageous for manufacturing, shipping, handling and installation reasons. However, low density conventional ceiling tile frequently has the disadvantage of being relatively soft and fragile such that it is easily damaged in shipping, handling, and installation. Ultimately, in service, prior art tile is frequently damaged when it is temporarily moved for access to the space or plenum above it, or is accidentally bumped or hit by objects being moved below it. Another problem encountered with some prior art ceiling tile is a tendency to sag out of a ceiling plane, particularly in humid conditions. Frequently, more durable, sag resistant product constructions are more costly to produce and, therefore, must sell at a premium price. There remains a need for a cost-effective ceiling tile that is more damage resistant and sag resistant than is commonly found in prior art ceiling tile construction.

SUMMARY OF THE INVENTION

The invention provides a ceiling tile construction that can be relatively inexpensive to produce and that is of a strong character so that it is relatively damage-resistant. It has been discovered that physically modifying a composite board constructed of natural materials can satisfy the need for both economy and durability.

The composite material comprises a homogeneous mixture of gypsum and cellulose fiber. A structural board formed of these materials typically made in a felting-like process, known in the industry, can be modified in accordance with the invention by creating numerous holes in the side of the board that ultimately becomes the room side or face of the tile.

The holes advantageously serve to reduce the effective density of the board material and to increase the noise reduction coefficient (NRC) exhibited by the tile. The cellulose fibers are homogeneously distributed and randomly oriented throughout the board and serve to make a board that possesses a high modulus of rupture (MOR) value, easily and cleanly in excess of what is required for ceiling tile applications, and an exceptionally high resistance to sag. Additionally, the composite nature of the board produces a sound deadening effect, reducing both reflected and transmitted noise. The constituent fibers serve to physically interlock the particles of gypsum in place so that potential dusting or sifting of such particles from the interior of the holes, which as disclosed are mechanically cut in the board, during shipment, handling and service, is effectively eliminated. Similarly, the embedment of the cellulose fibers in the gypsum matrix creates a product that can be easily and cleanly cut without excessive crumbling and without a significant presence of loose fiber ends.

Several variants of the inventive ceiling tile are disclosed. In a basic construction, the density reducing and sound-absorbing holes are blind, being cut by a suitable drilling operation, for example, from a side of the tile that when finally installed, faces the interior of a room or space. As a modification, a decorative porous fabric can be laminated on the room side of the tile over the holes to effectively conceal them from view and augmenting the sound absorbing function of the holes.

In another variant of the invention, the board is cut by suitable punches or other instrumentalities with holes that perforate, i.e. extend through its thickness.

In applications where free sound transmission through the perforated tile is objectionable, the back side of the board is laminated with a suitable imperforate web such as heavy paper stock. The punched holes can be concealed at the visible or room side of the tile with a porous fabric laminated to the room side. In both drilled and punched hole constructions, the holes can be of a uniform size and spacing or can be of different sizes and/or can be randomly spaced.

It has been found that a particularly suitable board construction for forming the structural core or body of tile of the invention is that disclosed in U.S. Pat. No. 5,320,677, the disclosure of which is hereby incorporated by reference. This board comprises relatively inexpensive natural materials that are combined in a unique board-forming process. A ceiling tile body composition made primarily of gypsum and cellulose fiber such as disclosed in this patent exhibits a high resistance to sagging and, besides the aforementioned low sifting performance where holes are drilled, machined or otherwise cut, is easily and neatly finished with an edge relief or detail without crumbling, fraying, or the like. The tile board, moreover, is exceptionally strong, making it highly resistant to damage under ordinary circumstances.

BRIEF DESCRIPTION OF THE DRAWINGS

FIG. 1 is a reflected plan view of a ceiling tile constructed in accordance with the invention;

FIG. 2 is a fragmentary cross-sectional view of the ceiling tile of FIG. 1;

FIG. 3 is a cross-sectional view of a second embodiment of a ceiling tile constructed in accordance with the invention; and FIG. 4 is a cross-sectional view of still another embodiment of the invention.

BRIEF DESCRIPTION OF THE PREFERRED EMBODIMENTS

FIGS. 1 and 2 illustrate a ceiling tile 10 according to one form of the invention. The tile 10 is rectangular in plan view, as is customary, with the illustrated unit being square and it being understood that the tile can be elongated from that shown. More specifically, the tile 10 will ordinarily be made nominally at approximately 2 foot by 2 foot, 2 foot by 4 foot, 4 foot by 4 foot, 2-½ foot by 5 foot, 5 foot by 5 foot, and 1 foot by 6 foot in plan dimensions. The unusual strength of the disclosed tile or core enables the use of relatively large panels without undue risk of breakage. The tile 10 is relatively thin in comparison to the planar dimensions having a thickness of for example, nominally ½ inch or less. The tile 10 is preferably cut from a larger preformed board, ideally of a thickness corresponding to the thickness of the tile.

The tile 10 is characterized by the inclusion of a plurality of holes 11 that are distributed substantially fully across its room side face 12. The holes 11 are blind in the sense that they do not extend completely through the thickness of the tile 10. The holes 11 are formed short enough to leave a wall 13 preferably relatively thin in comparison to the thickness of the tile 10 at the back side of the tile, i.e. the side 14 opposed to the room face 12. In the illustrated example of FIGS. 1 and 2, the holes 11 are in a regular pattern and are of a uniform size of, for example, ⅜ inch diameter. The holes 11 serve to increase the noise reduction coefficient (NRC) of the board and, at the same time, reduce the weight and effective net density of the tile 10.

The tile 10, in accordance with the invention, is a composite of natural materials primarily comprising gypsum and cellulose fiber. In the prior art, these materials have previously been combined in various forms, proportions and processes, to produce boards for construction purposes, although these prior art products have apparently not been considered commercially for ceiling tile applications. The preferred composite material for making a preform for the present suspended ceiling tile is that disclosed in the aforementioned U.S. Pat. No. 5,320,677. A gypsum based material ordinarily exhibits low tensile strength and, as a corollary, has very limited cohesiveness, making it relatively friable or crumbly. Gypsum is also relatively heavy or dense. In part, these characteristics explain why a gypsum based material is not ordinarily considered for suspended ceiling tile applications. A cellulose fiber gypsum composite material, on the other hand, can exhibit relatively high tensile strength to weight ratios. Morever, cellulose fiber gypsum composites exhibit relatively high fire resistance, which can be of great benefit in ceiling tile applications. Still further, it has been found that cellulose fiber/gypsum composites, properly made, can afford exceptional sag resistance, a very important characteristic in ceiling tile products. The ratio of cellulose fiber to gypsum is between about 8% to about 30% and, preferably, between 8% to 15% by weight of cellulose fibers to the respective compliment of gypsum. The cellulose fibers and gypsum preferably make up about at least 90% and, more preferably, at least 95% of the dry solids of the finished board from which the tile 10 or structural boards described below are fabricated. Additives for facilitating the slurry/felting process of the tile or board or enhancing its properties such as accelerators, retarders, weight reducing fillers and the like can make up the balance of the tile or board weight. The composite board is characterized by the cellulose fibers being homogeneously and randomly oriented throughout the gypsum matrix.

A very desirable property of cellulose fiber/gypsum composites seemingly unrecognized in finished goods as contrasted with "rough" construction is that they can be cut with a knife or otherwise machined without creating excessive residual loose dust or loosely attached particles or fibers in the remaining cut surface. Additionally, the cellulose fiber/gypsum composition permits the holes 11 to be formed very close to the edges of the tile without a high risk of failure of the material between the hole and edge. The composite material disclosed in aforementioned U.S. Pat. No. 5,320,677 resulting from gypsum calcined in a dilute cellulose fiber slurry under pressure, dewatered and subsequently rehydrated to be recrystallized in and about the voids in the cellulose fibers and thereby interlocked therewith, is particularly suited for use in practicing the invention. This material, besides its superior strength/weight characteristics, has been discovered to be exceptionally sag resistant. In addition, the material is particularly suitable for creating a preformed board or tile that, after setting, is subsequently machined or otherwise cut to form the weight reducing and sound absorbing holes 11, as well as any edge treatment such as a rabbet 16 shown in FIG. 2. The intimate bonding of the dihydrate crystals and cellulose fibers results in clean, relatively smooth cut surfaces generally devoid of loose gypsum particles and/or cellulose fibers and partially attached or hanging fibers. This clean cuttability of the preferred material yields a quality appearance without secondary finishing operations. Another important advantage to the integrated homogenous structure of the gypsum/cellulose fiber composite is that it resists sifting in the area of the machined, drilled, or otherwise cut holes 11 during subsequent handling, shipping, installation, and service. Such sifting would otherwise create problems, particularly for the installer and ultimate user. The material removed in forming the holes 11 can be 100% recycled into the raw materials used to make the preformed board from which the tile 10 is made. The tile 10 can be painted or coated with a suitable appearance coating before or after the holes 11 are drilled or otherwise cut.

With reference to FIG. 3, where a high NRC performance is desired above that obtainable just with the provision of the holes 11, a ceiling tile 20 can be formed by providing a porous fabric 21 on a structural body 22. The porous fabric 21 can be a non-woven glass fiber scrim known in the industry. The fabric 21 can be laminated to the body 22 with a suitable adhesive known in the art and initially preferably applied to the structural body 22. The structural body 22 can be substantially identical, in composition and form, to the ceiling tile 10 described in connection with FIGS. 1 and 2. In the illustration of FIG. 3, the structural body 22 is depicted without the edge detail 16 of the tile 10 of FIGS. 1 and 2. Since the holes 11 of the structural body 22 are blind, i.e. as shown in FIG. 3, being surrounded by the homogenous body, air does not pass or breathe through them, and airborne dirt is not drawn onto the fabric 21 so that ghosting of holes 11 does not occur at the outer face of the fabric 21. If desired, more than one porous or fabric layer can be laminated to the room side of the body 22 to increase the NRC of the tile 20 and/or achieve a desired appearance.

FIG. 4 illustrates the cross-section of a suspended ceiling tile 30 having a structural core or body 31 and a sound barrier sheet 32 laminated to the back or rear face of the body. The body 31 can be formed of a material and process like the body of the tile 10 of FIGS. 1 and 2 described above. Lightening and sound absorbing holes 33 are cut into the structural body 31 after the body has been set and prior to the lamination of the barrier sheet 32. The holes can be cut preferably by punches known in the art or by drill bits or other instrumentalities. The sound barrier sheet 32 is an imperforate web made, for example, of paper such as the heavy paper stock used in the making of wallboard. The sound barrier sheet 32 is preferably laminated to the core with a suitable adhesive. If desired, a porous fabric or sheet can be provided between the body 31 and the barrier sheet 32 to increase the NRC of the tile.

While not shown, the modified versions of the ceiling tile of FIGS. 3 and 4 can be provided with an edge detail such as the rabbet 16 seen in FIG. 2 if desired. Any of the ceiling tiles 10, 20 or 30 can be painted for appearance purposes and for potential sound absorbing benefit.

The tile structures 10, 22 and 31 are all characterized by being fabricated of a cellulose gypsum composite preferably of the type disclosed in U.S. Pat. No. 5,320,677 and subsequent to being rendered into rigid boards or preforms from a felting process are provided with a plurality of spaced holes effectively open at the front or room facing side of the tile.

The holes are cut by drilling with appropriate bits or by punching with tool punches or are otherwise machined into the composite board. As mentioned, a homogeneous mix of randomly oriented cellulose fibers and gypsum particles forming the tile or structural core of the tile creates a structure that is fire resistant, dimensionally stable and notably sag resistant. Still further, an important feature offered by the invention, is the characteristic of such material to resist sifting once the structural board is cut in forming the holes and any edge detail. The intimate bonding of the cellulose fibers and gypsum particles reduces the potential for such particulate sifting and for fibers or portions thereof to lie loose and unsightly at the edges of any cut holes or cut edge detail. Preferably, the holes 11, 33 are of sufficient size and quantity that the tile 10 or body 22, 31 is reduced in weigh by at least about 10% and, more preferably to at least about 20% from what such tile or board would weight without such holes.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A method of making a suspended ceiling tile comprising calcining gypsum in a dilute water slurry, under pressure, with at least 90% of the solids being about 8% to about 30% cellulose fibers and the respective compliment being of gypsum, dewatering the slurry before rehydrating the gypsum, and rehydrating and crystallizing the gypsum in and about voids in the cellulose fibers to form a homogenous non-air-permeable, rigid preform composite board and after the preform board has set by rehydration and crystallization of the gypsum, cutting a plurality of holes in a face of the preform board by removing the material in the space of the holes to lower its effective weight and to increase its NRC, the hole cutting and/or subsequent processing leaving the holes blind at the side of the tile opposite said face and in essentially free communication across their individual areas with the atmosphere at said face, said holes being cut through said board, and a side of said board is covered with an imperforate web adhered to said side.

2. A method as set forth in claim 1, including covering said holes with a porous fabric adhered to said face.

* * * * *